United States Patent [19]

Gillespie

[11] 4,196,748

[45] Apr. 8, 1980

[54] MULTIPLE STRENGTH FLUID DISTRIBUTION APPARATUS

[75] Inventor: Robert A. Gillespie, Bridgeport, Conn.

[73] Assignee: Stauffer Chemical Company, Westport, Conn.

[21] Appl. No.: 861,149

[22] Filed: Dec. 16, 1977

[51] Int. Cl.² .............................................. F16K 19/00
[52] U.S. Cl. ................................... 137/565; 137/597; 137/604; 184/6
[58] Field of Search ....................... 137/565, 597, 604; 184/6

[56] References Cited

U.S. PATENT DOCUMENTS

| | | |
|---|---|---|
| 2,545,812 | 3/1951 | Hosford . |
| 2,748,790 | 6/1956 | Hodgens . |
| 3,170,539 | 2/1965 | Snay . |
| 3,171,510 | 3/1965 | Olsen . |
| 3,267,964 | 8/1966 | Steinmetz . |
| 3,280,941 | 10/1966 | Fischer . |
| 3,417,779 | 12/1968 | Golay ............................. 137/597 X |
| 3,613,997 | 10/1971 | Thompson ..................... 137/604 X |
| 3,651,830 | 3/1972 | Kollmai ............................... 137/565 |

Primary Examiner—Robert G. Nilson
Attorney, Agent, or Firm—Robert A. Gillespie

[57] ABSTRACT

Apparatus for the distribution of liquids of varying concentrations including a liquid source, first conduit means, at least one other conduit means and means for supplying diluent to the other conduit means. The first conduit means has an end leading from the liquid source and also has discharge means for distributing liquid from the source. The other conduit means lead from the first conduit means and also has discharge means. The apparatus is particularly useful for distributing lubricants to chain conveyor systems.

12 Claims, 4 Drawing Figures

MULTIPLE STRENGTH FLUID DISTRIBUTION APPARATUS

BACKGROUND OF THE INVENTION

This invention relates to an apparatus for distributing liquids of varying concentrations. More particularly, the invention relates to such an apparatus adapted for distributing lubricants to a sanitary chain conveyor system.

Sanitary chain conveyor systems are used extensively in food and beverage plants to convey bottles, cans, cases, containers, etc., to various pieces of equipment such as case unloaders, case stackers, can and bottle warmers, washers, fillers, labelers, cappers, etc. These conveyors are lubricated by various means in order to reduce the friction between the object being conveyed and the conveyor itself, thus preventing damage to the conveyor and the conveyor drive mechanism, the equipment being fed by the conveyor and the object being conveyed. The lubricant also prevents dirt and dust build up on the conveyor and its drive mechanism, thus keeping it sanitary and in good working order.

Lubrication is generally accomplished by pumping a stock solution made from concentrate and water through tubing to spray nozzles which are mounted so that they apply a stream of diluted lubricant onto the sanitary conveyor at strategic points. For example, a bottling plant for soft drinks may require 15 to 30 points of application on 7 or 8 different conveyors and dead plate areas from a common stock solution tank. The stock solution is generally made up automatically to a known dilution by various means, such as volumetric metering of dilution water and concentrated lubricant, or by conductivity control of the stock solution in the tank. Typical of these prior art systems is the one described in U.S. Pat. No. 3,280,941.

However, such systems present a problem where lubricaton with more than one strength solution is desired. Equipment that is used to make up the stock solution automatically is relatively expensive, and multiple units have been used to give the different strengths required. For example, a more concentrated lubricating solution is required after the filler where the food product being packaged is often spilled onto the conveyor, in areas where dirty returned bottles are being conveyed to a bottle washer, and in dead-plate areas. These areas are known as "trouble" application points and it has been found that merely increasing the volume of application of lubricant at these points does not solve the problem satisfactorily. Thus, the installation of multiple stock solution tanks operating at different dilutions have been required in order to handle these "trouble" application points as well as the normal points that require a less concentrated lubricating solution.

SUMMARY OF THE INVENTION

It is the object of this invention to provide an apparatus for the distribution of liquids of varying concentrations.

It is a further object of this invention to provide such an apparatus having the capability for simultaneously delivering liquids of varying concentration.

It is still another object of this invention to provide an apparatus for distributing lubricants of varying concentrations to a sanitary chain conveyor system.

According to this invention, an apparatus is provided which includes a liquid source, conduit means having an end leading from the liquid source and having discharge means for distributing liquid from the source, at least one other conduit means leading from the first conduit means, and having second discharge means, and means for supplying diluent to the other conduit means.

DETAILED DESCRIPTION OF THE INVENTION

Figure 1:
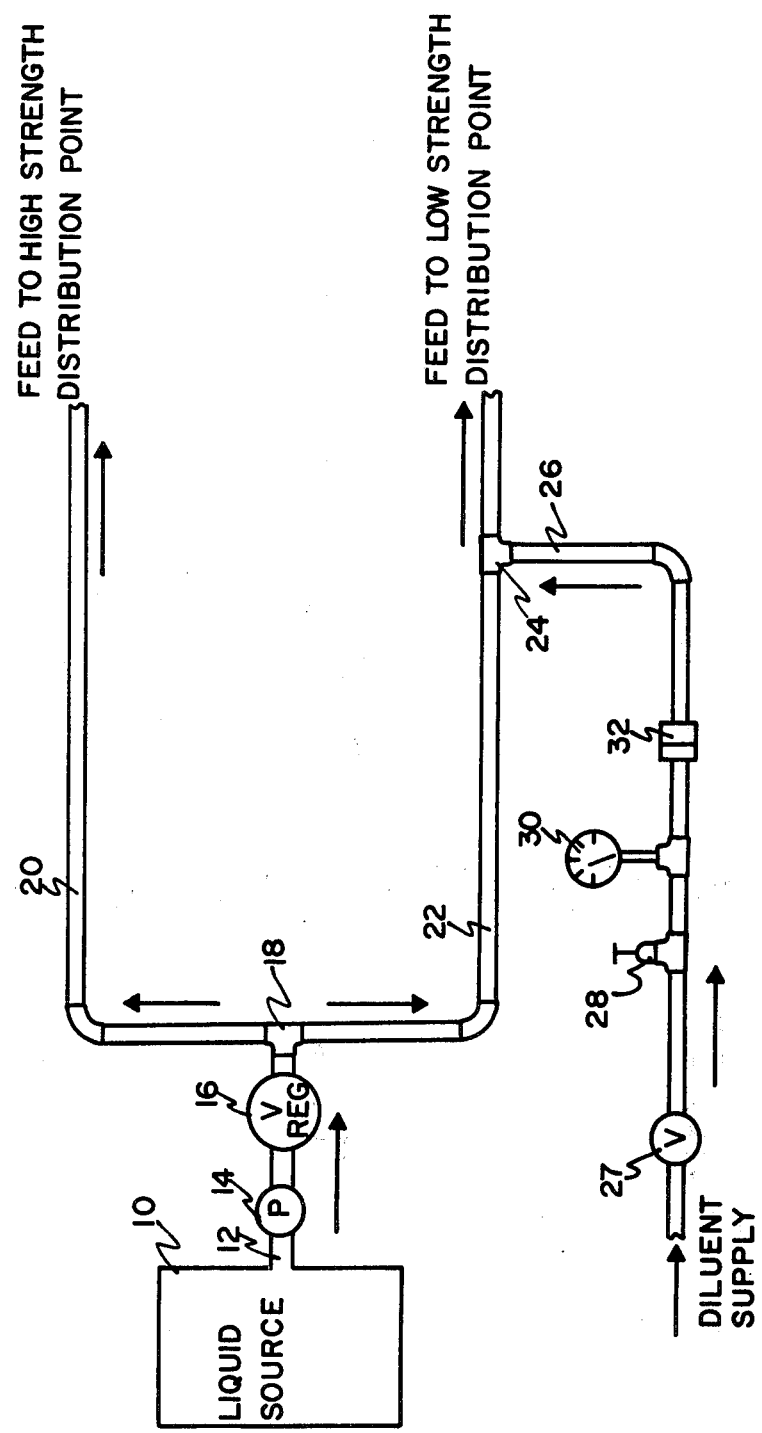
FIG. 1 is a diagrammatic view of the distribution apparatus of the invention.

Referring to FIG. 1, there is shown a liquid source 10 for supplying liquid to the distribution system. The liquid is supplied at the highest strength desired. The liquid is pumped through piping 12 by pump 14, regulated by constant pressure outlet valve 16. The liquid divides at tee 18, part of it flowing through piping 20 to be distributed at the high strength distribution point. The other part of the liquid flows through piping 22 and is mixed with diluent at tee 24. The diluent is admitted from a supply through piping 26 by controlling pressure regulator 28 and pressure gage 30, thus allowing the diluent to flow through constant orifice valve 32. After mixing with the diluent, the diluted liquid is fed to the low strength distribution point. Distribution at both the high strength and low strength points is accomplished by any appropriate means, such as spraying, etc. Valve 27 is closed when pump 14 is shut off, thus preventing diluent alone from being fed to the distribution points.

Figure 2:
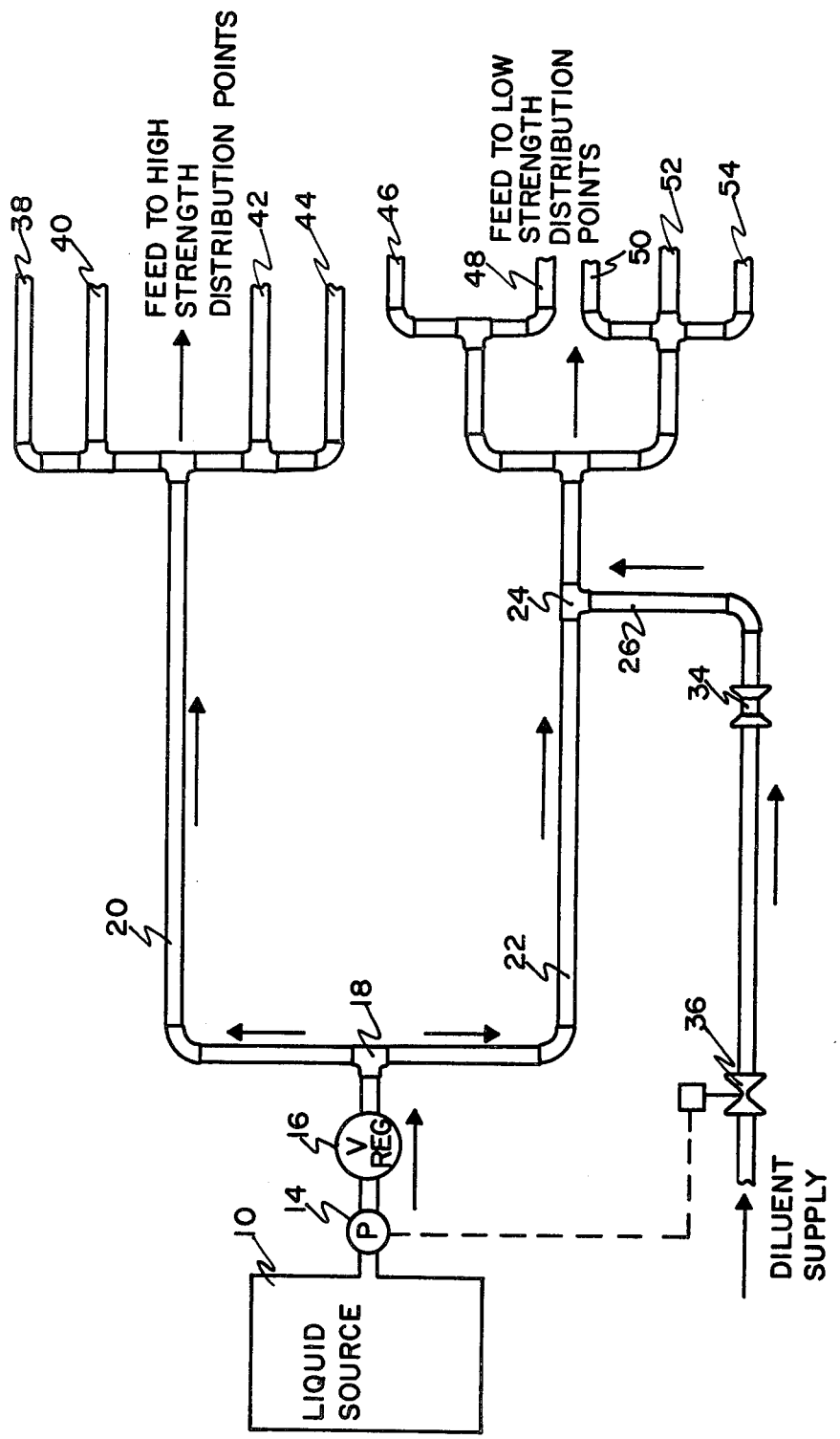
FIG. 2 is a diagrammatic view of another embodiment of the invention.

FIG. 2 illustrates another embodiment of the invention which differs from FIG. 1 in the number of distribution points and the means for supplying diluent. Thus, diluent is provided through a variable orifice type valve 34 which controls the flow of diluent regardless of the up-stream pressure to a constant gallons per minute flow rate. This system is also automatic by virtue of the solenoid valve 36 which is attached to the same electrical contacts as pump 14, thus supplying diluent to piping 26 upon activation of pump 14. Piping 20 is connected to piping 38, 40, 42 and 44 which feed the high strength liquid to distribution points, while piping 22 is connected to piping 46, 48, 50, 52 and 54 which feed the low strength distribution points. This embodiment of the invention is preferred because it provides for control of the flow of diluent and for distribution of liquid to any desired number of points.

Figure 3:
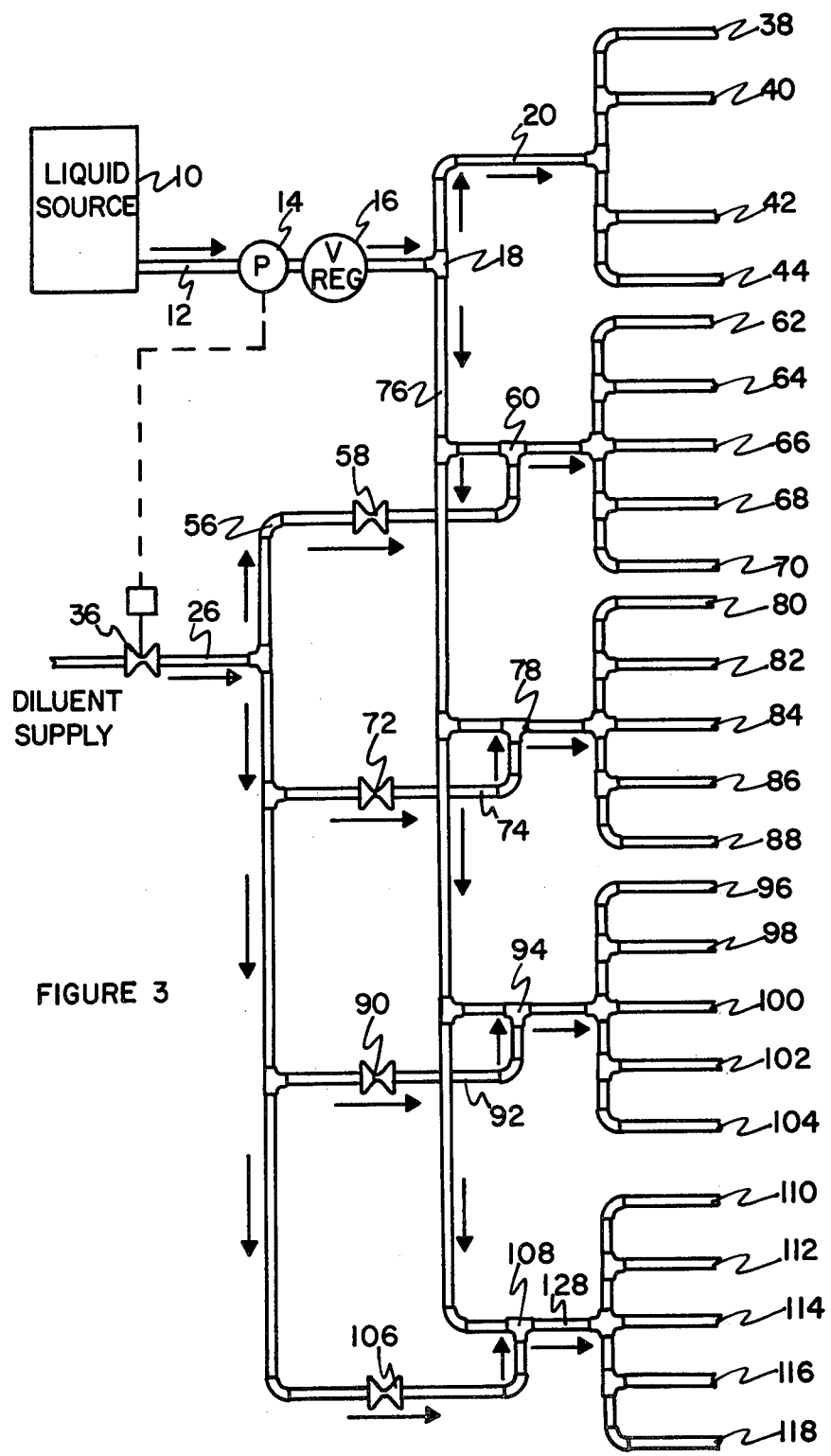
FIG. 3 is a diagrammatic view of still another embodiment of the invention having a plurality of conduit means.

In FIG. 3, an apparatus capable of distributing liquids of five different strengths is shown. Thus, piping 12 is divided at tee 18 into piping 20 which feeds the most concentrated liquid to the appropriate distribution points, by means of piping 38, 40, 42 and 44, and piping 76 which feeds to a lower concentration distribution point. Diluent flows through valve 36, piping 26, piping 56, valve 58, and is mixed with the liquid in piping 76 at tee 60. It is then fed to piping 62, 64, 66, 68 and 70 for distribution. Diluent also flows from piping 26 through valve 72 in piping 74 and is mixed with liquid from piping 76 at tee 78 for distribution through piping 80, 82, 84, 86 and 88. Valves 58 and 72 are operated to admit diluent at different rates, thus providing for different concentrations at the distribution points connected with the respective valves. In a similar manner, diluent flows through valve 90 and piping 92 and is mixed with liquid from piping 76 at tee 94 for distribution through piping 96, 98, 100, 102 and 104. The last means for distribution is accomplished by causing diluent to flow through valve 106 and mix with liquid from piping 76 at tee 108 for distribution through piping 110, 112, 114, 116 and 118. Valves 58, 72, 90 and 106 are controlled to admit diluent at different rates, thus providing for distribution of liquids of varying concentrations.

Figure 4:
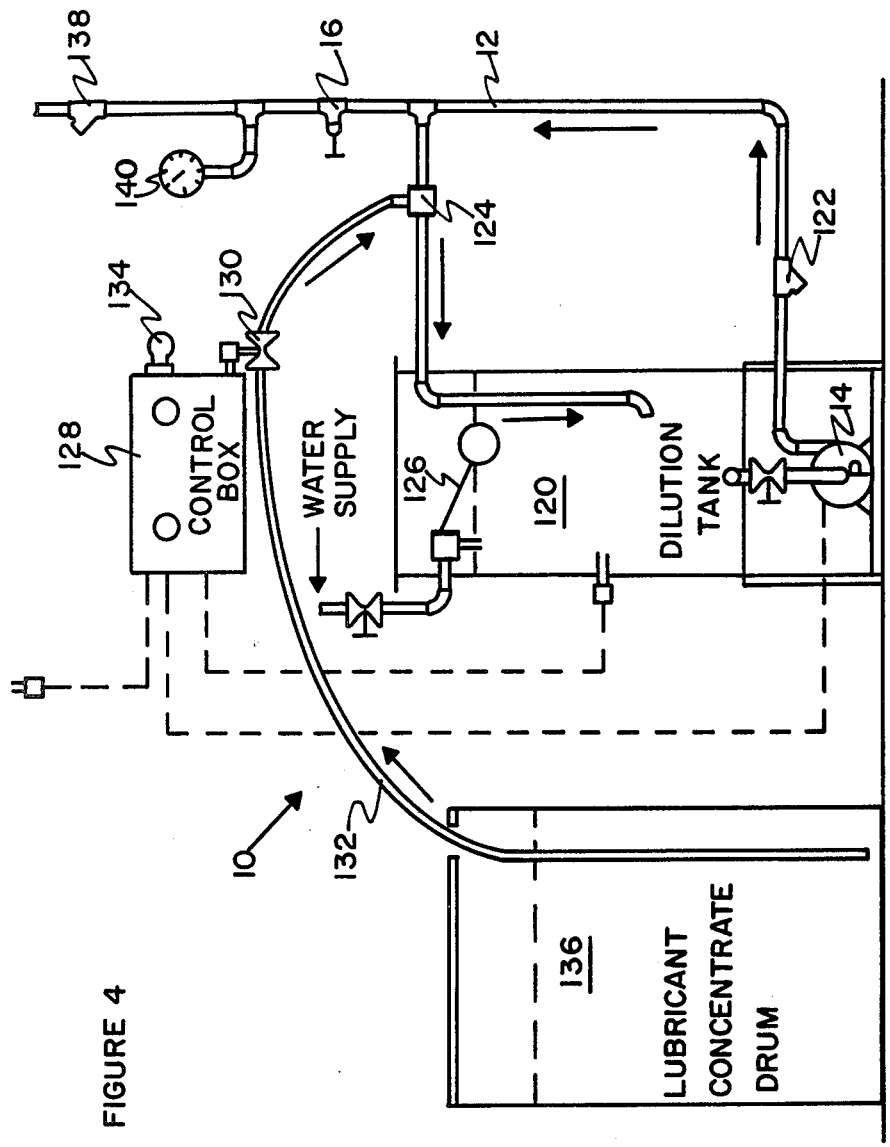
FIG. 4 is a diagrammatic view of a liquid source suitable for use with the apparatus of this invention.

FIG. 4 depicts one type of liquid source for use in connection with the apparatus of this invention. The source illustrated is particularly useful where lubricants are to be dispersed to a sanitary chain conveyor system. Lubricant of the desired strength is pumped from dilution tank 120 by pump 14, and passes through line strainer 122 and piping 12 to one of the systems shown in FIGS. 1–3. The liquid also recirculates through venturi injector 124 back to dilution tank 120. This keeps the liquid in the tank adequately agitated. Pump 14 also creates a pressure on pressure regulator 16. When the level in dilution tank 120 drops through usage of the diluted lubricant at the spray heads and nozzles, water level float valve 126 opens and admits fresh water to dilution tank 120 to maintain its level. As the concentration of lubricant in dilution tank 120 drops, it is sensed in the control box 128 and solenoid valve 130 is opened. This causes the venturi injector 124 to draw concentrated lubricant through tubing 132 which mixes with the recirculating fluid from the pump and increases the concentration in dilution tank 120 until a conductivity controller in the control box 128 is satisfied. Then solenoid valve 130 closes. Warning light 134 is introduced into the circuit in such a way that if solenoid valve 130 remains open for more than 2 minutes, the light is turned on. This would be an indication that the lubricant concentrate drum 136 is empty or that something else has failed in the system causing the conductivity controller to be unsatisfied. If solenoid valve 130 remains open for less than 2 minutes, warning light 134 does not light. Check valve 138 prevents the lines in the distribution apparatus from draining back to the liquid source when the system is shut off. Pressure gage 140 is used to establish a known pressure at the tee 18 in FIGS. 1, 2 and 3.

In order to illustrate more fully the operation of the apparatus of this invention, a typical lubricating procedure that was carried out in a soft drink bottling plant will be described. The plant previously had been supplying lubricant to all points at a dilution of 400 parts water to one part lubricant concentrate. An apparatus similar to that described in FIG. 2 and FIG. 4 was employed with the exception that 3 high strength distribution points and 16 low strength distribution points were used. The controls were set so that dilution tank 120 contains a dilution of 350 parts of water to one part of lubricant concentrate and pressure regulator 16 was regulated to 8 lbs. per square inch gage. The 3 high strength application points on the conveyor system consumed a total of 3.8 gallons per hour at this concentration. Water was admitted to piping 22 at tee 24 at a rate of 7.5 gallons per hour. The total usage from the 16 low strength distribution points was 18.8 gallons per hour, so the dilution was calculated to be 582 parts of water to one part of lubricant concentrate. This represented a savings in lubricant usage of 33 percent over the previous method of running all the spray points at the highest strength dilution.

The apparatus depicted in the drawings can be modified in the practice of this invention. For example, the arrangement of the piping can be varied, in both size, placement, etc. The piping can be made of metal, glass, plastic, or any other suitable material. Furthermore, different valve means and different sources of liquid concentrate can be utilized.

Although the invention has been described in connection with certain preferred embodiments, it is intended that the invention cover all alternatives, arrangements, equivalents, and embodiments as may be included in the scope of the following claims.

What is claimed is:

1. Apparatus for the distribution of lubricating fluids of varying concentrations to a sanitary chain conveyor system comprising:
    (a) a lubricating fluid source;
    (b) a first conduit means having a first end leading from said source and having a first discharge means spaced from said first end for distributing lubricating fluid from said source onto the sanitary conveyor system at strategic points;
    (c) at least one other conduit means leading from said first conduit means, positioned intermediate said first end and said first discharge means;
    (d) means for supplying lubricating fluid diluent to said other conduit means;
    (e) said other conduit means having a second discharge means for distributing diluted lubricating fluid onto the sanitary conveyor system at strategic points;
    (f) activating means for initiating the flow of lubricating fluid from said source; and
    (g) means for automatically supplying diluent to said other conduit means upon said activation.

2. The apparatus of claim 1, wherein said activating means comprises a pump and a constant pressure outlet valve, and said means for automatically supplying diluent comprises a solenoid valve electrically connected to said pump.

3. The apparatus of claim 1, wherein said means for supplying diluent includes means for controlling the flow of diluent to said second conduit means.

4. The apparatus of claim 3, wherein said means for controlling the flow of diluent includes a variable orifice valve.

5. The apparatus of claim 3, wherein said means for controlling the flow of diluent includes a pressure regulator and a constant orifice valve.

6. The apparatus of claim 1, wherein the first and second discharge means simultaneously distribute the fluids.

7. Apparatus for the distribution of lubricating fluids of varying concentrations to a sanitary chain conveyor system comprising:
    (a) a lubricating fluid source;
    (b) a first conduit means having a first end leading from said source and having a first discharge means spaced from said first end for distributing lubricating fluid from said source onto the sanitary conveyor system at strategic points;
    (c) a plurality of other conduit means leading from said first conduit means, positioned intermediate said first end and said first discharge means;
    (d) means for supplying lubricating fluid diluent to each of said other conduit means;

(e) each of said other conduit means having a second discharge means for distributing diluted lubricating fluid onto the sanitary conveyor system at strategic points;

(f) activating means for initiating the flow of lubricating fluid from said source; and (g) means for automatically supplying diluent to each of said other conduit means upon said activation.

8. The apparatus of claim 7, wherein said activating means comprises a pump and a constant pressure outlet valve, and said means for automatically supplying diluent comprises a solenoid valve electricaly connected to said pump.

9. The apparatus of claim 7, wherein said means for supplying diluent includes means for controlling the flow of diluent to each of said other conduit means.

10. The apparatus of claim 9, wherein said means for controlling the flow of diluent includes a variable orifice valve.

11. The apparatus of claim 9, wherein said means for controlling the flow of diluent includes a pressure regulator and a constant orifice valve.

12. The apparatus of claim 7, wherein the first and second discharge means simultaneously distribute the fluids.

* * * * *